United States Patent
Rozenblatt

(10) Patent No.: US 6,325,356 B1
(45) Date of Patent: Dec. 4, 2001

(54) LONG LIFE ROTARY GATE VALVE FOR AIRCRAFT VACUUM TOILET SYSTEM

(75) Inventor: Mike M. Rozenblatt, Manhattan Beach, CA (US)

(73) Assignee: Mag Aerospace Industries, Inc., Compton, CA (US)

( * ) Notice: Subject to any disclaimer, the term of this patent is extended or adjusted under 35 U.S.C. 154(b) by 0 days.

(21) Appl. No.: 08/851,145

(22) Filed: May 5, 1997

(51) Int. Cl.[7] .................................................. F16K 1/16
(52) U.S. Cl. ................................... 251/302; 251/301
(58) Field of Search .................................. 251/298, 299, 251/300, 301, 302

(56) References Cited

U.S. PATENT DOCUMENTS

| | | |
|---|---|---|
| 157,628 | 12/1874 | Morgenstern . |
| 1,528,528 | 3/1925 | Cheney . |
| 2,781,787 | 2/1957 | Johnson . |
| 2,925,247 | 2/1960 | Fletcher . |
| 3,577,568 | 5/1971 | Johansen . |
| 3,611,446 | 10/1971 | Howard . |
| 3,835,479 | 9/1974 | Milette et al. . |
| 3,924,832 | 12/1975 | Babcock . |
| 4,587,989 | 5/1986 | Mayhew . |
| 4,637,079 | 1/1987 | Hodge . |
| 4,713,847 | 12/1987 | Oldfelt et al. . |
| 4,783,859 | 11/1988 | Rozenblatt et al. . |
| 5,165,457 | 11/1992 | Olin et al. . |

Primary Examiner—John Rivell
Assistant Examiner—Meredith H. Schoenfeld
(74) Attorney, Agent, or Firm—Christie, Parker & Hale, LLP

(57) ABSTRACT

A light weight gate valve and method for a aircraft vacuum toilet system. The valve resists jamming due to scale buildup, thereby reducing maintenance costs associated with repair or cleaning. The gate valve is intended for mounting between two portions of a sewer pipe connected between a waste receiving bowl and a waste reservoir. More particularly, the gate valve includes a housing having an internal valve chamber with an inlet opening opposing an outlet opening. A slice-of-pie shaped rotary gate is mounted within the chamber of the housing for rotation about a predetermined axis to selectively allow fluid communication between the inlet and outlet of the housing for flushing of the toilet. The gate has opposing side surfaces, each of which opposes an associated sidewall of the chamber enclosing the gate. The distance between each the side surface of the gate and its associated sidewall of the chamber is from 0.050 inch to 0.120 inch. While this separation is small enough to prevent most foreign objects from becoming wedges between the disk and the housing, this separation is sufficient to significantly reduce valve maintenance due to scale build-up on the sides of the gate. Other detailed features offer associated advantages.

2 Claims, 6 Drawing Sheets

LONG LIFE ROTARY GATE VALVE FOR AIRCRAFT VACUUM TOILET SYSTEM

BACKGROUND OF THE INVENTION

The invention relates generally to vacuum toilet systems for aircraft, and, more particularly, to discharge valves with rotary gates in such systems.

Lavatories having vacuum toilet systems have been used in aircraft for many years. One such vacuum toilet system has a waste-receiving bowl connected to a waste reservoir by a sewer pipe. A discharge valve is mounted on the sewer pipe to selectively allow fluid communication from the bowl to the waste reservoir. To power the toilet system, the waste reservoir is maintained under a pressure that is substantially lower than the pressure in the waste-receiving bowl, which is typically under the near-atmospheric pressure of the aircraft's passenger cabin. Thus, when the discharge valve is opened, the pressure differential between the bowl and the reservoir causes the waste in the bowl to be drawn through the pipe into the waste reservoir.

A vacuum toilet system with a discharge valve is described in U.S. Pat. No. 4,713,847. This discharge valve has a cylindrical housing that has an inner chamber sized to contain a disk-shaped gate with a hole therein. One side of the housing has an inlet aligned with an outlet located on the other side of the housing. The waste-receiving bowl is connected to the inlet of the housing by one portion of a sewer pipe and the waste reservoir is connected to the outlet of the valve housing via another portion of the sewer pipe.

A drive mechanism selectively rotates the circular gate between an open position and a closed position. In the open position, the hole in the disk-shaped gate is aligned between the inlet and the outlet to allow fluid communication for the flushing of the toilet. In the closed position, the gate blocks fluid communication between the inlet and the outlet to prevent fluid flow from the pressure differential between the bowl and the reservoir.

Applicant's assignee, MAG Aerospace Industries, Inc. has for several years sold a discharge valve having a disc shaped gate valve, known as the Monogram Sanitation Orbital Valve, Part No. 14330-050. The experience which applicant's assignee has had with this valve shows that, while it generally functions acceptably, there can be a problem associated with a scale-like deposit that builds up on the sides of its rotating disk-shaped gate and over its internal housing parts over years of exposure to the minerals and chemicals in the toilet system fluid. The scale deposit reduces the distance between the sides of the disk and the sides of the inner chamber, thereby increasing the likelihood that the disk will eventually jam inside of the housing to render the valve inoperative. Because of this scale-like deposit problem, airlines must clean or replace the gate valve before other devices in the aircraft require major servicing. Accordingly, this maintenance problem undesirably reduces the time that an aircraft is available for revenue generating operation, resulting in lost income to the airline.

Another drawback associated with the gate valve described above is that its circular disk adds extra weight to the aircraft. While other gate valves for non-aerospace applications have used valves with non-circular gates, applicant is unaware of any such valve that has a partially circular or pie-slice shaped gate for the purpose of weight reduction in an aircraft vacuum toilet system. Accordingly, applicant is not aware of any prior art reference that teaches or suggests a weight reduction due to a relatively thin, pie-slice shaped gate valve for aerospace applications.

It should therefore be appreciated that there is a need for an aircraft toilet system with a light weight gate valve that resists jamming due to scale buildup, thereby reducing maintenance costs. The present invention fulfills this need.

SUMMARY OF THE INVENTION

The present invention provides a light weight gate valve for an aircraft vacuum toilet system. The valve resists jamming due to scale buildup, thereby reducing maintenance costs associated with repair or cleaning.

The gate valve is intended for mounting between two portions of a sewer pipe connected between a waste receiving bowl and a waste reservoir. More particularly, the gate valve includes a housing having two internal sidewalls cooperatively defining an internal valve chamber with an inlet opening opposing an outlet opening. The inlet opening is connected to the portion of the sewer pipe in fluid communication with the waste receiving bowl and the outlet opening is connected to the portion of the sewer pipe in fluid communication with the waste reservoir. The sidewalls of the housing are located in opposed, parallel relation.

A gate is mounted between the interior sidewalls of the housing for rotation about a predetermined axis to selectively allow fluid communication between the inlet and outlet of the housing. The gate has opposing side surfaces, each of which opposes an associated one of the sidewalls within the housing and is in parallel relation thereto. The valve can also include an actuator, which can be, for example, a reversible electric motor or a pneumatic piston/cylinder, mounted to the housing to rotate the gate about the predetermined axis.

In the previously referred to Monogram Sanitation orbital valve, the spacing between each side of the disk and the adjacent interior wall of the housing was in the range of 0.0035 inch to 0.006 inch. The gap was determined by the clearance necessary between the housing and the face seal to ensure that the seal works well. In normal usage, with averagely hard water, mineral deposits would buildup to the level that the movement of the disk would be seriously inhibited, or stopped, in about three years. Unfortunately, this time period is less than the period of about four years at which airliners are typically taken out of service for major overhaul. The causes of the problem were not appreciated for a long time and, when they were, they were not obvious how they could be readily overcome. Applicant has taken the step of increasing the spacing between the side of the gate and each adjacent interior side wall of the housing, outside the region of the housing within the seal ring, to more than nine times the corresponding spacing in the region inside the seal ring. The spacing between the surfaces of the housing facing the gate in the region overlapped by and within the face seal remain as close as they were before. Applicant has thus created a dual level of spacing by removing more material from the internal faces of the housing opposed to the gate in the region outside the seal than lie within it. This is a step which would not be obvious due to the general desire in airline practice to hold dimensions to a minimum to satisfy weight and overall device envelope considerations. Applicant has also learned that there is an upper limit for the spacing of about 0.120 inch, beyond which the size and weight of the entire discharge valve becomes too large to be acceptable from a weight, size and cost standpoint. Thus, applicant's preferred spacing between each side of the disk valve and the adjacent interior wall of the housing in the region outside the seal, is in the range of 0.050 inch to 0.120 inches. The preferred spacing is about 0.060 inch. In the region within the seal it is still in the range of 0.0035 inch to 0.006 inch.

This separation in the region outside the seal is large enough to significantly reduce valve maintenance due to scale build-up on the sides of the gate. Thus, the operator of an aircraft utilizing the gate valve of the present invention can enjoy the cost savings associated with such reduced maintenance. Further, because the disk is less likely to jam, the toilet system is less likely to break down, thereby advantageously assuring that the full complement of lavatories on a particular aircraft are available for passenger use.

In more detailed aspects of the invention, the gate has a partial-disk shape, like a slice of pie, and also has a sharp edge along at least one edge of the periphery to cut debris. The partial-disk shape advantageously reduces the weight of the disk. The partial disk shape of the gate also contributes to reducing the likelihood of the gate jamming within the housing due to scale buildup or interference by small foreign objects. This contrasts with a full 360° gate. With a full 360° gate the working area of the gate facing the sidewalls of the housing in the region bounded by the face seal and traversing the seal, is cleaned by the wiping action of the seal. The portions of the full 360° gate that lie outside the seal and never traverse it are where mineral deposits can buildup, eventually causing it to bind or jam. By using a pie-shaped gate rather than a full circle, the surface area on which mineral deposits would accrue is substantially reduced, making the valve less susceptible to binding or jamming than a full 360° valve. The sharp peripheral edge of the gate can advantageously cut through mineral deposits between the inlet and the outlet of the housing, thereby allowing the gate valve to close and avoiding failure of the valve.

A method of operating a valve for a vacuum toilet system in an aircraft is also provided. The valve used in the method has a housing that encloses a gate and is intended for mounting between two portions of a sewer pipe connected between a waste receiving bowl and a waste reservoir. The gate has opposing side surfaces. A motor assembly, or piston-cylinder actuator, is connected to the gate to rotate the gate about a predetermined axis.

In particular, the method comprises providing two sidewalls within the housing to cooperatively define an internal valve chamber with an inlet opening opposing an outlet opening. The inlet opening is connected to the portion of the sewer pipe so that it is in fluid communication with the waste receiving bowl. The outlet opening is connected to the portion of the sewer pipe so that it is in fluid communication with the waste reservoir. The sidewalls of the housing are located in opposed, parallel relation.

The method also includes mounting the gate between the opposing sidewalls of the housing for rotation about the predetermined axis and so that the opposing side surfaces of the gate are each located a predetermined distance in a range between 0.050 and 0.120 inch away from an associated one of the housing sidewalls. The method further comprises selectively activating the motor to rotate the gate about said predetermined axis to selectively allow fluid communication between the inlet and outlet of said housing while maintaining the predetermined distance separating each side of the gate from its associated housing sidewall.

Like the apparatus of the invention, the method also provides a gate valve for an aircraft toilet system that advantageously can operate longer between maintenance intervals, thereby reducing costs for the aircraft operator.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the preferred embodiment of the invention. In such drawings.

DESCRIPTION OF THE PREFERRED EMBODIMENT

Figure 1:
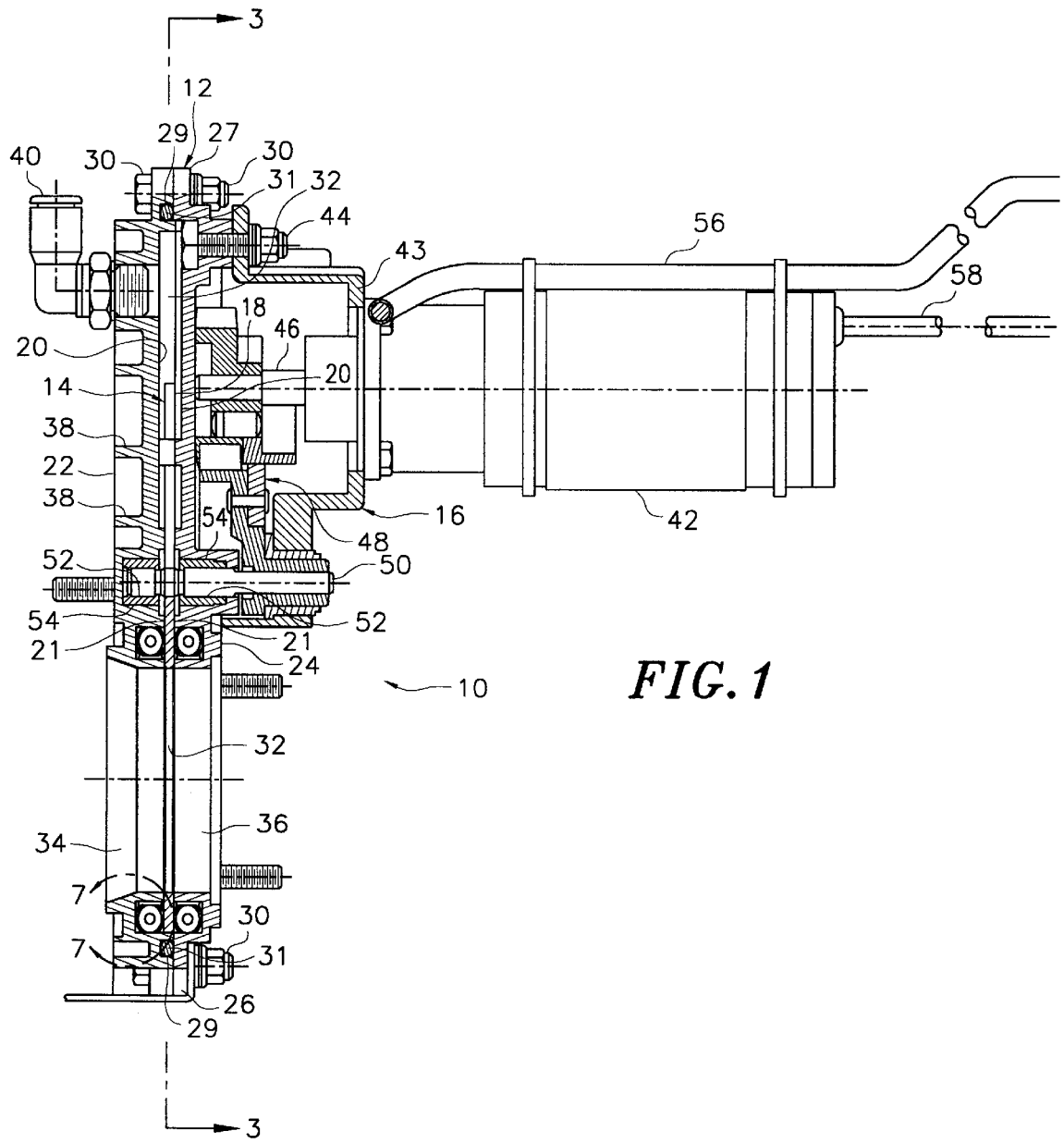
FIG. 1 is an elevational view, shown in partial cross section, of a gate valve assembly according to the invention.
Figure 2:
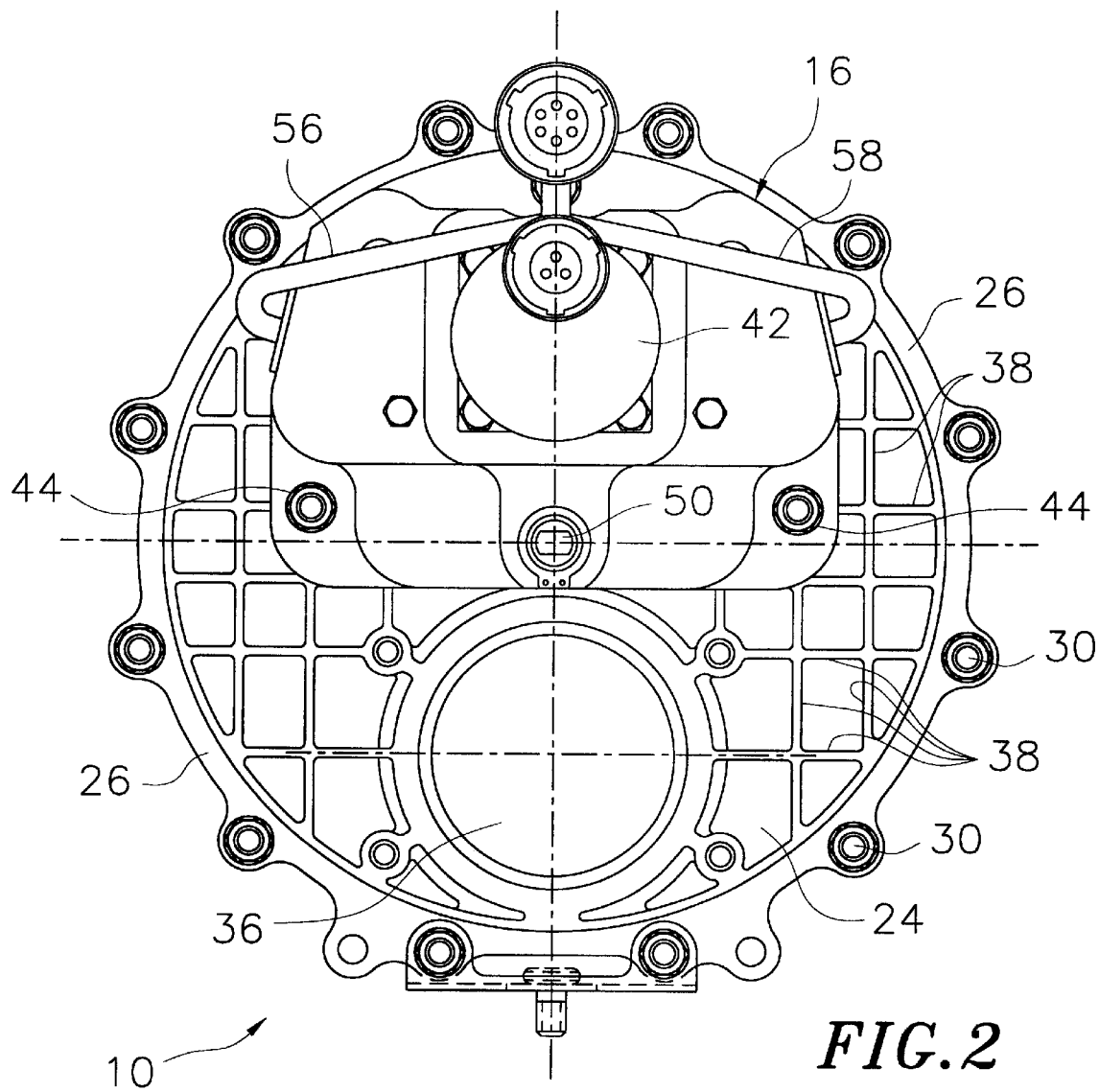
FIG. 2 is a rear elevational view of the gate valve assembly of FIG. 1.
Figure 3:
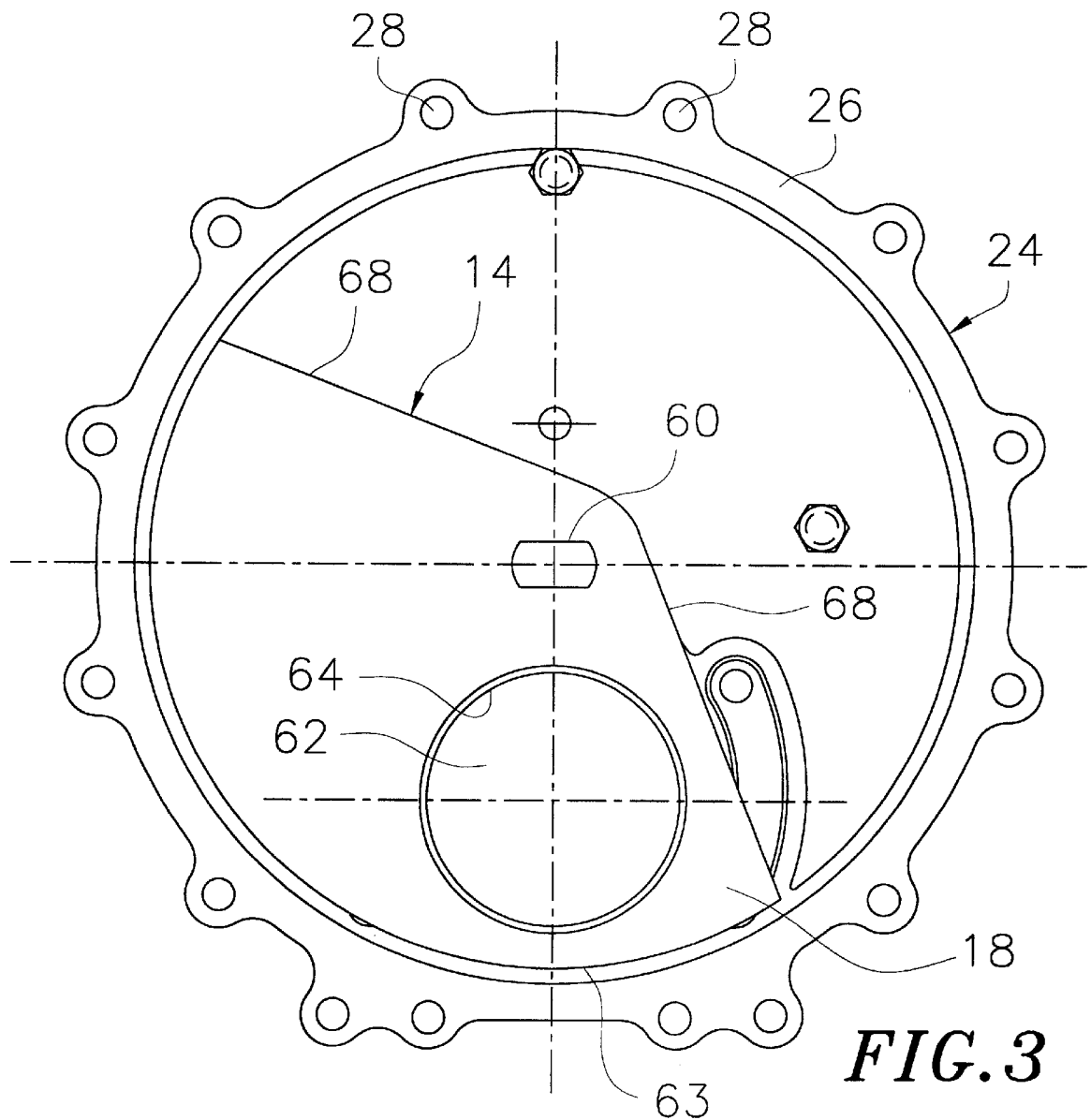
FIG. 3 is a cross sectional view of the gate valve assembly of FIG. 1, taken about line 3—3, showing the gate in an open position.

With reference now to the drawings, and particularly FIGS. 1, 2 and 3, the present invention is preferably embodied in a special gate valve assembly, generally referred to by the reference numeral 10, for an aircraft vacuum toilet system. The gate valve assembly 10 includes a housing 12 enclosing a gate 14 rotated by a motor assembly 16 mounted to the housing 12. As will be described below the clearance between the sides 18 of the gate 14 and the interior sidewalls 20 of the housing in the region outside the seals 72 is from 0.050 inch to 0.120 inch.

A clearance in this range, between the gate 14 and the housing 12, provides several important advantages, not obtained by the about 0.006 inch clearance presently used in the current Monogram Sanitation Orbital Valve. Significantly, while the clearance between the sides 18 of the gate 14 and the inside walls of the housing 12 still is small enough to keep small solid objects in the waste from becoming wedged between the disk and the housing 12, this enlarged clearance is advantageously sufficient to significantly reduce valve maintenance from scale build-up on the sides 18 of the gate 14 or the interior sidewalls 20 of the housing in the region outside the seals. In particular, the clearance allows the gate valve 10 to remain operational longer despite the scale build-up. Thus, maintenance savings are realized because of the increased time between gate replacement or cleaning due to scale deposits that might otherwise interfere with the free movement of the gate 14. The operator of an aircraft utilizing the preferred gate valve 10 can advantageously enjoy the cost savings associated with such reduced maintenance. Further, because the gate 14 is less likely to jam because of scale build-up, the toilet system is less likely to break down, thereby advantageously assuring that the full complement of lavatories on a particular aircraft are available for passenger use. Additional advantages related to other design features are described below.

Housing 12 has a generally circular front portion 22 and a generally circular rear portion 24, each of which has a circumferential flange 26 with holes 28 formed therein to accept nuts and bolts 30 fastening the two housing portions 22 and 24 together. The front housing portion 22 has a circular slot 29 sized to accept an O ring 31 therein to seal an internal chamber 32 within the housing 12. With regard to the internal chamber 32, each housing portion 22 and 24 has a sidewall 20 that defines the internal chamber 32 sized to enclose the gate 14.

A particular feature of the invention is that the interior sidewalls 20 of housing facing the pie-shaped disk valve outside the region embraced by the seal 31 are spaced a greater distance transversely away from the disk valve to create a greater spacing than the side walls in the regions of the housing within the perimeter of the seal. This arrangement ensures the correct spacing of the valve and housing sidewalls in the region where a smaller spacing is necessary for the seal to work well, while making provisions for a greater spacing of the sidewalls from the disk in the region that lies outside the seal where scale buildup is more likely to become an interference to movement in time.

The front housing portion 22 has a circular inlet 34 for connection to the sewer pipe connected to a waste receiving bowl of the aircraft toilet system (not shown). The rear housing portion 24 has an outlet 36 for connection to the sewer pipe leading to the waste reservoir (not shown) of the aircraft toilet system. Horizontal and vertical ribs 38 are formed on the outside of each housing portion 22 and 24 for increased strength and rigidity. The components of the housing assembly 12 can be made by well known manufacturing processes of any material of sufficient strength, including aluminum, titanium, plastics, stainless steel or other such suitable material.

A conduit 40 is connected through the upper edge of the front housing portion 22. The conduit 40 provides venting to the interior of the valve chamber to prevent waste matter from being sucked into the housing.

The motor assembly 16 includes an electric motor 42 mounted to a gear housing 43 which is connected to the rear housing portion 24 by bolts 44. The motor 42 has an output shaft 46 connected to a transmission 48 that rotates a drive shaft 50 located in a passage 52 extending through the center of the housing 12. The drive arrangement is the same as the previously referred to Monogram Sanitation orbital valve. Bearings 54 located between the passage 52 and the drive shaft 50 facilitate the rotation of the drive shaft 50 and the gate 14. Two power cables 56 and 58 provide power and control signals to the motor 42. Now that the housing 12 and motor assembly 16 have been addressed, the special gate 14 of the valve 10 will be described.

Figure 4:
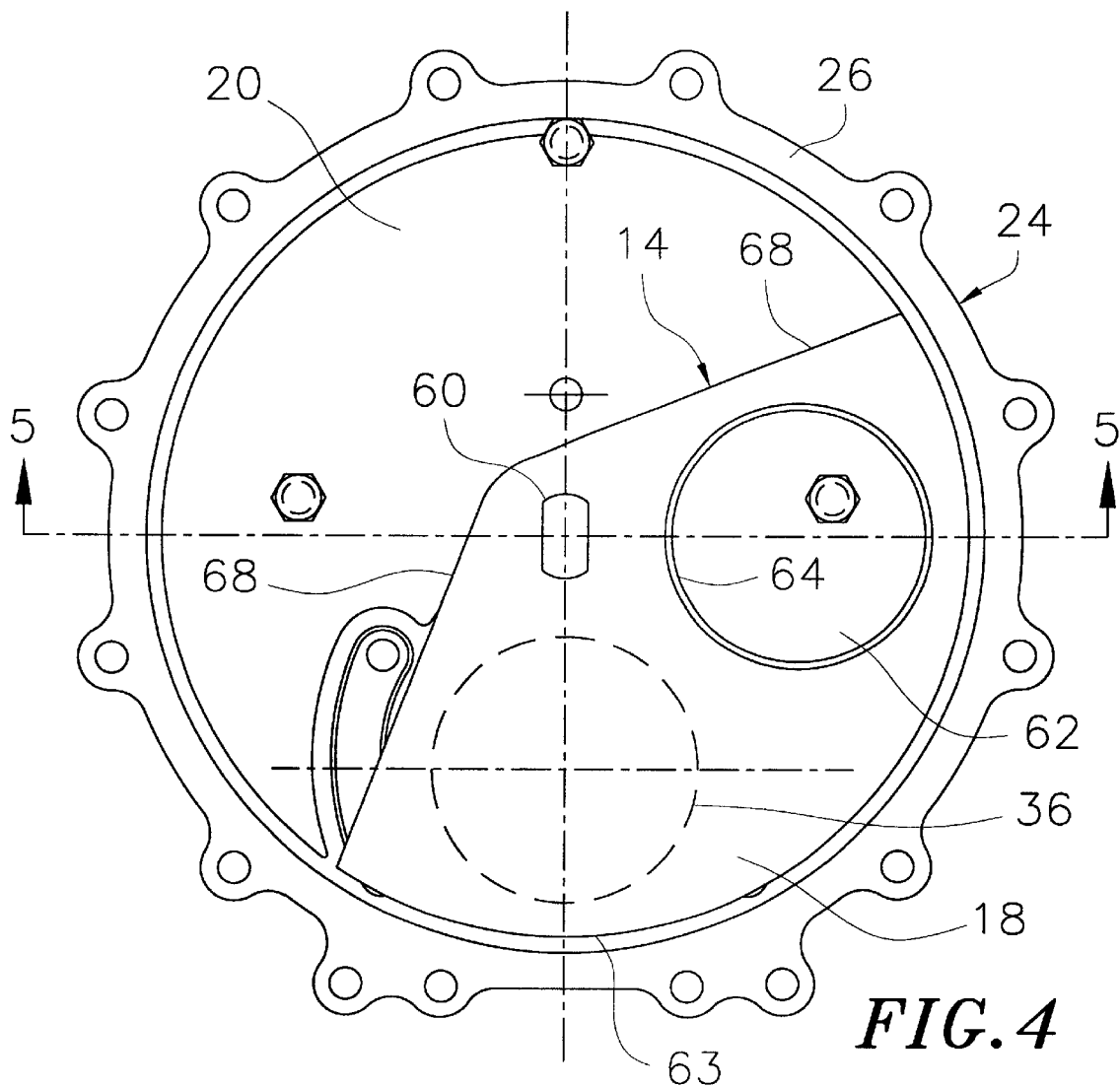
FIG. 4 is a cross sectional view of the gate valve assembly of FIG. 1, taken about line 3—3 showing the gate in a closed position.
Figure 5:
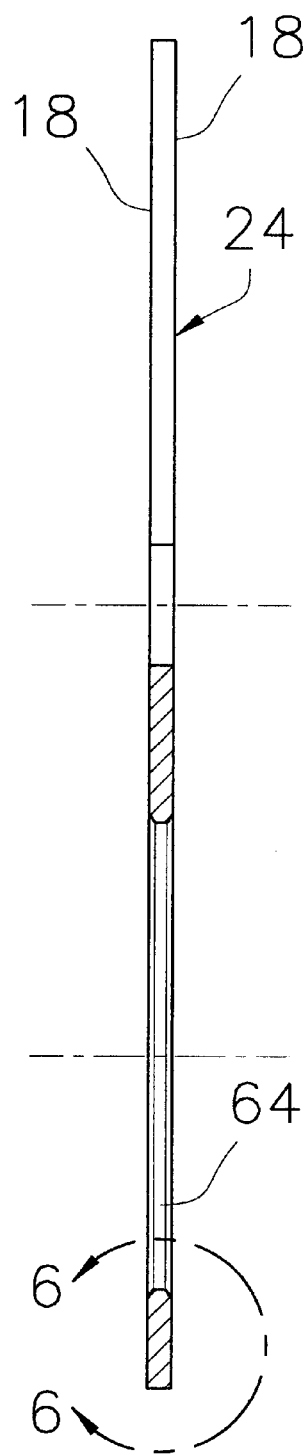
FIG. 5 is a cross sectional view of the gate of FIG. 4, taken about lines 5—5.
Figure 6:
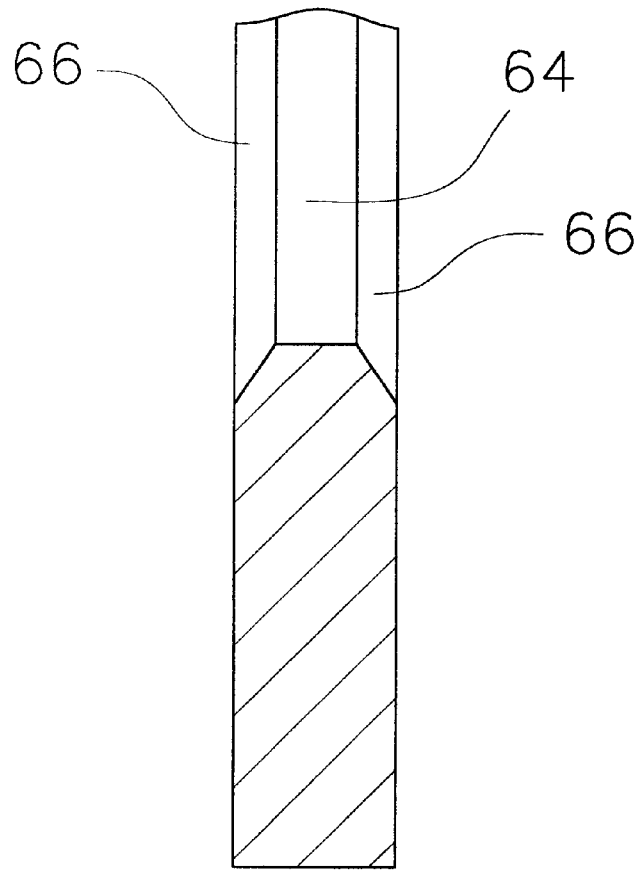
FIG. 6 is a detail view of the gate of FIG. 5, taken about lines 6—6.
Figure 7:
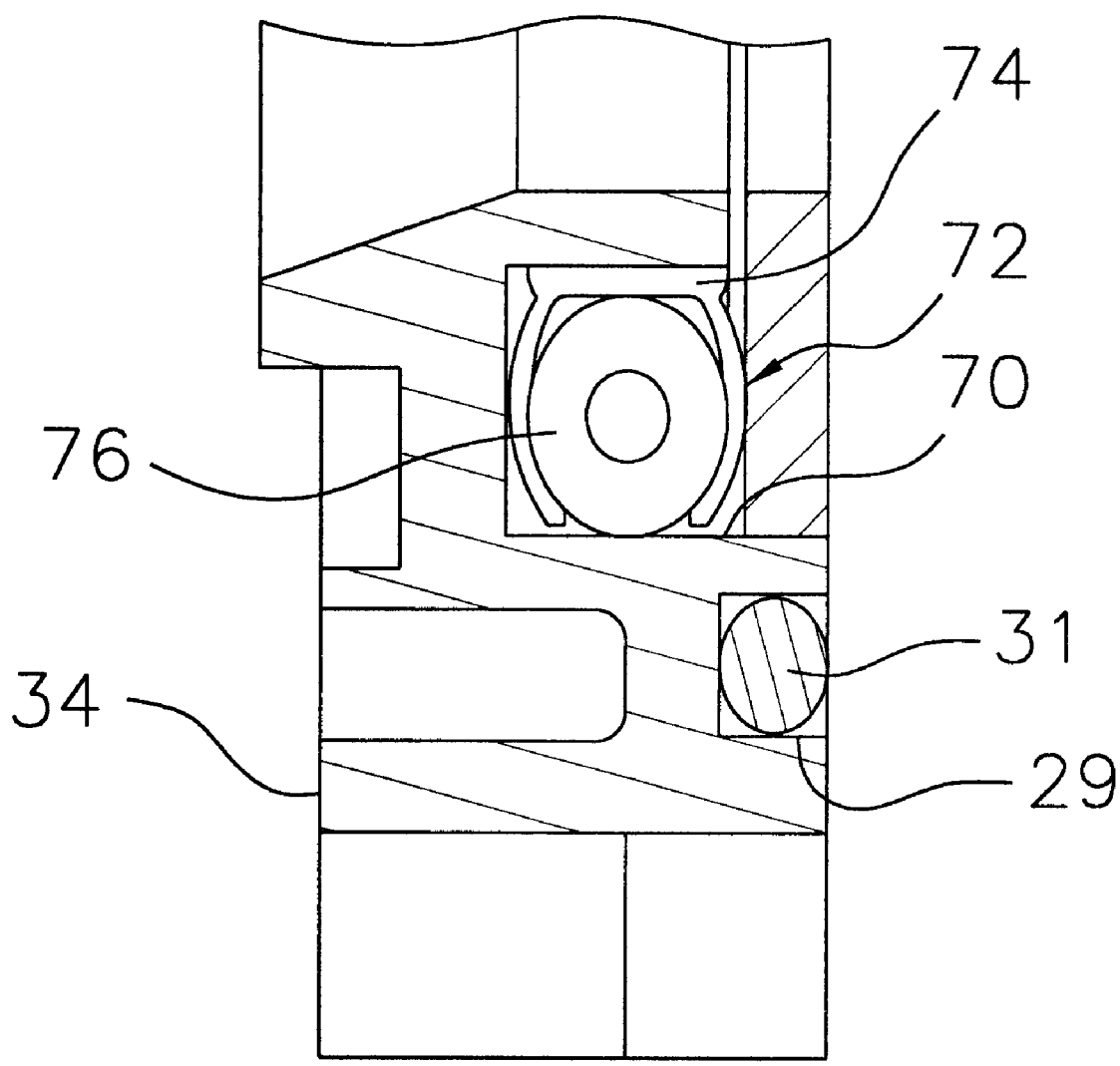
FIG. 7 is a detail view of the gate valve assembly of FIG. 1, taken about line 7—7.

The gate 14 has a flat partial disk, ie., slice-of-pie shape (FIGS. 3 and 5). A slot 60 sized to fit around the drive shaft 50 is located in the center of the diameter that the outer edge 63 would form. A hole 62 of the same diameter as the housing inlet 34 and outlet 36 is located adjacent to the outer edge 63 of the gate 14 (FIG. 6). The motor assembly 16 selectively rotates the gate 14 between and open position and a closed position. In the open position, the hole 62 in the gate 14 is aligned with the inlet and outlet 34 and 36 of the housing 12 to allow fluid flow through the valve 10 for flushing of the toilet The closed position of the gate 14 is shown in FIG. 4, where the hole 62 in the gate 14 is not aligned with the inlet and outlet 34 and 36 of the housing 12 and the gate 14 blocks fluid flow through the valve 10 to stop the flushing of the toilet. The leading and trailing edges 68 of the segment constituting the disk valve are not rounded or chamfered but are defined by a sharp, abrupt edge between two intersecting planes to thereby have good cutting properties so that any buildup of scale on the interior side wall 20 can most effectively be scraped away to avoid jamming of the disk. As shown in FIG. 7, the inlet and the outlet 34 and 36 of the housing 12 each have circular slots 70 that are sized to accept face seal assembly 72 therein. Face seal assembly 72 has a circular channel member 74 that holds an O ring 76.

The gate 14 can be made of stainless steel or other suitable material ground to a smooth finish. Significantly, the internal recess in the front and rear housing portions 22 and 24 defining the chamber 32 in the region outside the face seal is calculated to provide a certain clearance between the flat sides 18 of the gate 14 from the interior sidewalls 20 of the housing 12. This clearance between each side 18 of the disk and its associated housing sidewall 20 can be between a 0.050 inch to 0.120 inch in the region outside the seal. Within applicant's experience in discharge valves for vehicle waste systems, it is contrary to conventional experience with gate valves to provide such a large clearance and would not be obvious to do so.

The above clearance provides the significant advantages identified above. In addition to those advantages, the partial-disk shape, or slice-of-pie shape, of the gate 14 results in a smaller side surface area 18 adjacent to the interior sidewalls 20 of the housing 12. The partial-disk shape also results in improved durability and reliability of the gate valve 10, thereby decreasing maintenance costs and downtime for aircraft toilet system.

While a particular form of the invention has been illustrated and described, it will be apparent that various modifications can be made without departing from the spirit and scope of the invention. Additionally, the invention can be used with vacuum toilets for other forms of vehicle, for example, trains, boats, busses, and the like. Accordingly, it is not intended that the invention be limited, except as by the appended claims.

I claim:

1. A rotary gate valve for a vacuum toilet system in a vehicle, the valve intended for mounting between two portions of a sewer pipe connected between a waste receiving bowl and a waste reservoir, interior regions of the valve being subject to a build-up of scale-like deposits from the waste during extended use, the gate valve comprising:

a housing having two sidewalls fixedly connected to a peripheral wall, said walls cooperatively defining the sides of an cylindrical internal valve chamber having a central axis with an inlet opening opposing an outlet opening, said openings positioned between the center of said chamber and said peripheral wall, said inlet opening connected to the portion of the sewer pipe in fluid communication with the waste receiving bowl and said outlet opening connected to the portion of the sewer pipe in fluid communication with the waste reservoir, said sidewalls of said housing located in opposed, parallel relation; and a plate-like gate configured as a segment of a circle having an opening sized to correspond to said inlet and outlet openings and a peripheral edge in sliding relation with said peripheral wall and leading and trailing edges, said gate mounted between the interior sidewalls for rotation about said central axis between open and closed positions which allow and prevent fluid communication between the inlet and outlet of said housing in aligned and obscured positions of said inlet and outlet openings relative to said opening in said gate, respectively;

two aligned O-ring seals extending peripherally around said inlet and outlet openings in sealing contact with said gate on opposite sides thereof;

wherein said leading and trailing edges are shaped to cut through the deposits on said sidewalls and wherein the rotation of said gate is limited so that said leading and trailing edges do not traverse said inlet and outlet openings to avoid damaging said seals; and wherein said sidewalls, in a region within and surrounding said seals are sufficiently proximate to said gate to support said seals for sealing action against said gate, said sidewalls, elsewhere in said chamber, being spaced at a relatively greater distance from said gate on both sides thereof to provide a space in which deposits displaced by said leading and trailing edges can be accommodated thereby extending the period for which the valve can operate before becoming obstructed.

2. A rotary gate valve for a vacuum toilet system in a vehicle as defined in claim 1, wherein the spacing distance in the region extending inside said seals is in the range of 0.0035 to 0.006 inches; and wherein said relatively greater distance is in the range of 0.050 to 0.120 inches.

* * * * *